US008793391B2

(12) United States Patent
Hsu et al.

(10) Patent No.: US 8,793,391 B2
(45) Date of Patent: Jul. 29, 2014

(54) DISTORTION-AWARE MULTIHOMED SCALABLE VIDEO STREAMING TO MULTIPLE CLIENTS

(75) Inventors: Cheng-Hsin Hsu, Mountain View, CA (US); Nikolaos Markos Freris, Zurich-Oerlikon (CH); Jatinder Pal Singh, Mountain View, CA (US); Xiaoqing Zhu, Mountain View, CA (US)

(73) Assignee: Deutsche Telekom AG, Bonn (DE)

(*) Notice: Subject to any disclaimer, the term of this patent is extended or adjusted under 35 U.S.C. 154(b) by 0 days.

(21) Appl. No.: 12/956,998

(22) Filed: Nov. 30, 2010

(65) Prior Publication Data
US 2012/0137016 A1    May 31, 2012

(51) Int. Cl.
| | |
|---|---|
| H04N 21/2662 | (2011.01) |
| H04N 7/26 | (2006.01) |
| H04N 21/2343 | (2011.01) |
| H04N 21/2381 | (2011.01) |
| H04N 21/41 | (2011.01) |

(52) U.S. Cl.
CPC ....... *H04N 19/002* (2013.01); *H04N 19/00175* (2013.01); *H04N 21/234327* (2013.01); *H04N 21/2381* (2013.01); *H04N 21/4126* (2013.01)
USPC .......................................... 709/231; 370/329

(58) Field of Classification Search
USPC ................. 370/234, 252, 352, 229, 351, 445; 375/240.27; 709/231–233
See application file for complete search history.

(56) References Cited

U.S. PATENT DOCUMENTS

| | | | | |
|---|---|---|---|---|
| 5,748,786 | A  * | 5/1998 | Zandi et al. | 382/240 |
| 6,016,305 | A  * | 1/2000 | Borst et al. | 370/234 |
| 6,215,774 | B1 * | 4/2001 | Knauerhase et al. | 370/252 |
| 6,222,941 | B1 * | 4/2001 | Zandi et al. | 382/232 |
| 6,240,243 | B1 * | 5/2001 | Chen et al. | 386/344 |
| 6,327,392 | B1 * | 12/2001 | Li | 382/248 |
| 6,567,081 | B1 * | 5/2003 | Li et al. | 345/419 |
| 7,274,661 | B2 | 9/2007 | Harrell et al. | |
| 7,574,726 | B2 | 8/2009 | Zhang et al. | |
| 7,717,342 | B2 | 5/2010 | Wang | |
| 2002/0048405 | A1* | 4/2002 | Zandi et al. | 382/232 |
| 2002/0141393 | A1* | 10/2002 | Eriksson et al. | 370/352 |
| 2002/0150044 | A1* | 10/2002 | Wu et al. | 370/229 |

(Continued)

OTHER PUBLICATIONS

Iain Richardson, "H. 264 Advanced Video Compression Standard", 2nd Edition, May 2010, Chapter 10.*

(Continued)

*Primary Examiner* — Asad Nawaz
*Assistant Examiner* — Zhaohui Yang
(74) *Attorney, Agent, or Firm* — Leydig, Voit & Mayer, Ltd.

(57) ABSTRACT

The described system and method provide joint rate control and scalable stream adaptation for multiple clients concurrently competing for the same access networks. For each such client, an optimization problem is constructed and solved to determine the streaming rate over each access network, the video packets to be transmitted, and the access network over which each video packet is sent. The rate control and stream adaptation problem is constructed as an integer program in an embodiment of the invention, with an objective to minimize a cost function of the expected video distortion. Randomized packet scheduling is accounted for in an embodiment of the invention by relaxing the integer program into real-valued optimization programs and deriving convex programming approximations.

7 Claims, 19 Drawing Sheets

(56) References Cited

U.S. PATENT DOCUMENTS

| | | |
|---|---|---|
| 2003/0095783 A1 | 5/2003 | Binder et al. |
| 2005/0100229 A1* | 5/2005 | Becker et al. ............... 382/232 |
| 2006/0067296 A1* | 3/2006 | Bershad et al. ............. 370/351 |
| 2006/0088099 A1 | 4/2006 | Gao et al. |
| 2006/0187952 A1* | 8/2006 | Kappes et al. .............. 370/445 |
| 2008/0107173 A1 | 5/2008 | van Beek |
| 2008/0192738 A1* | 8/2008 | Florencio et al. ........... 370/389 |
| 2009/0019505 A1 | 1/2009 | Gopalakrishnan et al. |
| 2009/0086827 A1* | 4/2009 | Wu et al. ................. 375/240.27 |
| 2009/0122867 A1* | 5/2009 | Mauchly et al. ......... 375/240.16 |
| 2009/0175251 A1 | 7/2009 | Litzinger et al. |
| 2009/0254666 A1 | 10/2009 | Agulnik et al. |
| 2010/0017530 A1 | 1/2010 | Gaur |
| 2010/0091841 A1* | 4/2010 | Ishtiaq et al. ............. 375/240.02 |

OTHER PUBLICATIONS

Huszák et al., "Content-aware Interface Selection Method for Multi-Path Video Streaming in Best-effort Networks", Proceedings of International Conference on Telecommunication, 2009, ICT '09, p. 196-201, published Jul. 7, 2009.*

Zhu et al., "Distributed Rate Allocation Policies for Multihomed Video Streaming Over Heterogeneous Access Networks", IEEE Transactions on Multimedia, 11(4), Jun. 2009.*

Kang et al., "Contention-Free Distributed Dynamic Reservation MAC Protocol with Deterministic Scheduling (C-FD3R MAC) for Wireless ATM Networks", IEEE Journal on Selected Areas in Communications, 18(9), Sep. 2000.*

Sun et al., "An Overview of Scalable Video Streaming", Feb. 2007, pp. 8-11.*

* cited by examiner $$\min_x \quad C(d) \qquad (6a)$$

$$\text{s.t.} \quad r_n = \frac{F}{M}\sum_{u=1}^{U}\sum_{m=1}^{M}\sum_{q=0}^{Q} s_{u,m,q} x_{u,m,q,n}, \qquad (6b)$$

$$p_n = e^{-t_0(c_n - r_n)/\alpha_n}, \qquad (6c)$$

$$x_{u,m,q} = \sum_{n=1}^{N}(1-p_n)x_{u,m,q,n}, \qquad (6d)$$

$$\hat{\delta}_{u,m} = \sum_{q=0}^{Q}(1 - \prod_{q' \leq q} x_{u,m,q'})\delta_{u,m,q}, \qquad (6e)$$

$$\alpha_{u,m} + \sum_{k \in P_{u,m}} \beta_{u,m,k} e_{u,k}, \qquad (6f)$$

$$e_{u,m} + y_{u,m}, \qquad (6g)$$

$$\sum_{n=1}^{N} x_{u,m,q,n} \leq 1, \qquad (6h)$$

$$x_{u,m,q,n} \in \{0,1\}. \qquad (6i)$$

*FIG. 6*

$$\min_{x} \quad C(d) \tag{7a}$$

$$\text{s.t.} \quad r_n = \frac{F}{M}\sum_{u=1}^{U}\sum_{m=1}^{M}\sum_{q=0}^{Q}s_{u,m,q}x_{u,m,q,n} \tag{7b}$$

$$p_n \geq e^{-t_0(c_n-r_n)/\alpha_n} \tag{7c}$$

$$x_{u,m,q} \leq \sum_{n=1}^{N}(1-p_n)x_{u,m,q,n} \tag{7d}$$

$$e_{u,m} \geq \hat{\delta}_{u,m} + \sum_{q=0}^{Q}\Big(1 - \prod_{q' \leq q} x_{u,m,q'}\Big)\delta_{u,m,q} \tag{7e}$$

$$y_{u,m} \geq \alpha_{u,m} + \sum_{k \in P_{u,m}}\beta_{u,m,k}e_{u,k} \tag{7f}$$

$$d_{u,m} = e_{u,m} + y_{u,m} \tag{7g}$$

$$\sum_{n=1}^{N} x_{u,m,q,n} \leq 1 \tag{7h}$$

$$x_{u,m,q,n} \in [0,1]. \tag{7i}$$

$\underbrace{\phantom{xxxxxxxxxxxxxxxxxxxxxxxxxxxxxxxxxx}}_{700}$

*FIG. 7*

SRDO

0. INPUT: maximum packet loss probability, $P_{max}$
1. set $x = \{x_{u,m,q,n} = 0 \mid \forall \, u, m, q, n\}$
2. sort $g_{u,m,q}$ on $\frac{\delta_{u,m,q}}{s_{u,m,q}}$
3. do
4.     let $g_{\hat{u},\hat{m},\hat{q}}$ be the next unsent NALU
5.     sort networks on $p_n$
6.     for $n = 1$ to $N$
7.         if sending $g_{\hat{u},\hat{m},\hat{q}}$ on $n$ yields $p_n < P_{max}$
8.             update $x$ with $x_{\hat{u},\hat{m},\hat{q},n} = 1$
9.             break
10.        end
11.     end
12. while $\sum_{n=1}^{N} x_{\hat{u},\hat{m},\hat{q},n} > 0$ and there are unsent NALUs
13. return $x$

PRDO

1. set $x = \{x_{u,m,q,n} = 0 \mid \forall u, m, q, n\}$
2. forever
3.    let $g_d$ be the set of all immediately decodable NALUs
4.    if $g_d$ is empty return $x$
5.    for $g_{u,m,q} \in g_d$
6.      for $n = 1$ to $N$
7.        compute $b_{u,m,q,n}$ based on $x$
8.      end
9.    end
10.   let $\frac{b_{\hat{u},\hat{m},\hat{q},\hat{n}}}{s_{\hat{u},\hat{m},\hat{q}}} \geq \frac{b_{u,m,q,n}}{s_{u,m,q}} \ \forall u, m, q, n$
11.   if $b_{\hat{u},\hat{m},\hat{q},\hat{n}} \leq 0$ return $x$
12.   update $x$ with $x_{\hat{u},\hat{m},\hat{q},\hat{n}} = 1$, update $g_d$
13. end

900

$$\min_{x} \quad C(d) \quad (10a)$$

$$\text{s.t.} \quad r_n = \sum_{u=1}^{U} \frac{F_u}{M} \sum_{m=1}^{M} \sum_{q=0}^{Q} s_{u,m,q} x_{u,m,q,n}, \quad (10b)$$

$$p_n \geq e^{\frac{t_0(\alpha_n - r_n)}{\alpha_n}}, \quad (10c)$$

$$x_{u,m,q} \leq \min\{L_m^1(\xi, x, p) := \sum_{n=1}^{N}(\xi_1(n)x_{u,m,q,n} + (1-p_n)\xi_2(n) - \xi_1(n)\xi_2(n)) \geq \sum_{n=1}^{N}(1-p_n)x_{u,m,q,n}, \quad (10d)$$

$$\forall (x, p) \in \{0,1\}^N \times \{0,1\}^N\};$$

$$\xi \in \{0,1\}^N \times \{0,1\}^N \quad (10e)$$

$$\hat{\delta}_{u,m} + \sum_{q=0}^{Q}(1 - \min_{q' \leq q} x_{u,m,q'})\delta_{u,m,q},$$

$$e_{u,m} \geq \alpha_{u,m} + \sum_{k \in P_{u,m}} \beta_{u,m,k} e_{u,k}, \quad (10f)$$

$$y_{u,m} = e_{u,m} + y_{u,m}, \quad (10g)$$

$$d_{u,m} = \sum_{n=1}^{N} x_{u,m,q,n} \leq 1, \quad (10h)$$

$$x_{u,m,q,n} \in [0,1] \quad (10i)$$

$$\underbrace{\phantom{xxxxxxxxxxxxxxxxxxxxxxxxxxxxxxxxxxxxxxxxxxxxxxxxxxxxxxxxxxxxxx}}_{1000}$$

FIG. 10

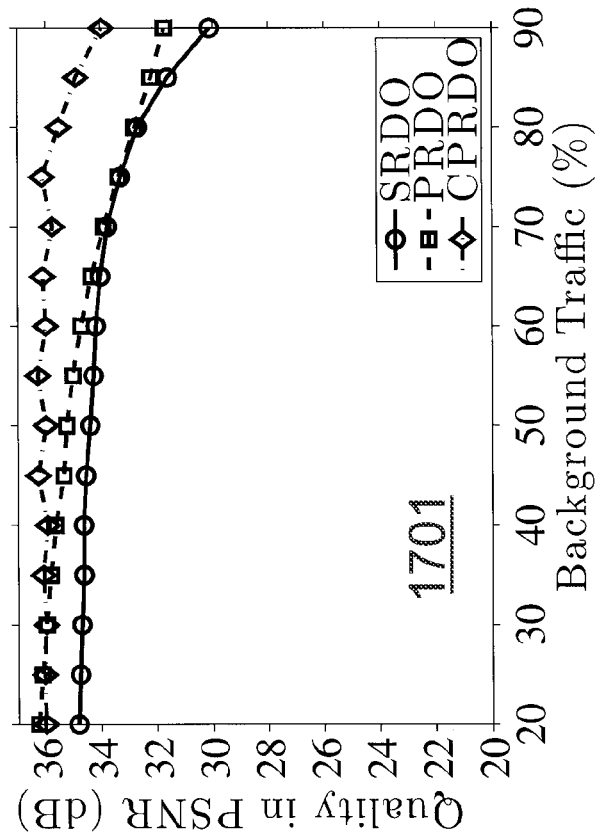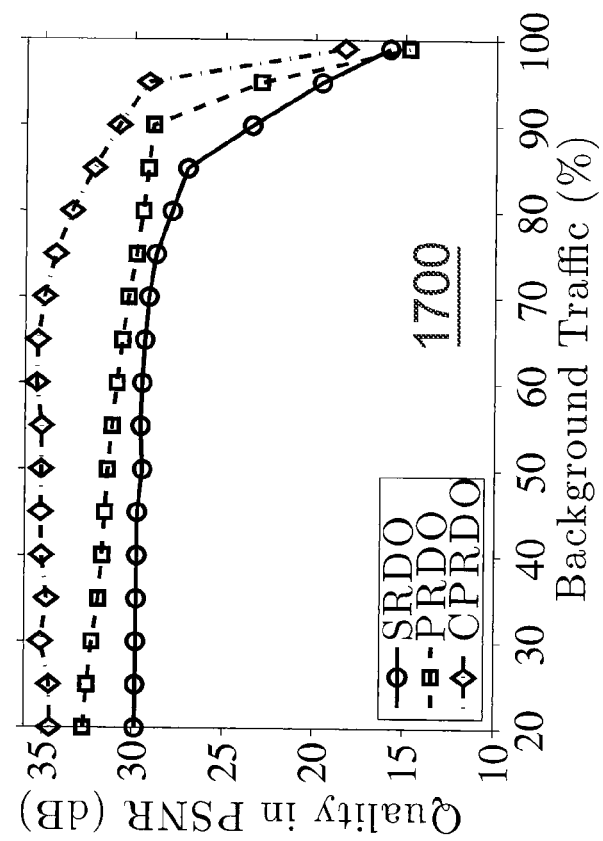
FIG. 17

DISTORTION-AWARE MULTIHOMED SCALABLE VIDEO STREAMING TO MULTIPLE CLIENTS

FIELD

The present invention relates to the field of video streaming, and more particularly to a system and method for distortion-aware packet scheduling for multihomed video streaming, from a server to multiple clients across multiple heterogeneous access networks.

BACKGROUND

Modern laptops and hand-held devices can access multiple networks with diverse and dynamic characteristics. For example, 3G data networks offer pervasive connectivity but may suffer from low network capacity, while Wireless Local-Area Networks (WLANs) may provide higher capacity but with tighter locational constraints. Multihomed video streaming offers a way to allow pervasive connectivity while mitigating the bandwidth constraints that often accompany such connectivity.

In multihomed video streaming, a video is concurrently sent over multiple access networks in order to achieve higher aggregate bandwidth, more pervasive connectivity, improved error resilience, and lower communication delays. Several US mobile service providers have reported large data traffic increases in their 3G data networks due to smart phone users. In this regard, multihoming can help offload traffic from congested networks, in order to attain better streaming quality, as well as lower transit costs for service providers.

SUMMARY

In an embodiment of the invention, a method is provided for joint rate control and scalable stream adaptation for multiple clients concurrently competing for one or more access networks comprising. For each client, an optimization is constructed to determine a streaming rate over each access network, and the video packets to be transmitted and the access network over which each video packet is to be sent are determined. An integer program is produced to model the rate control and stream adaptation for each client to minimize a cost function of expected video distortion, such that the minimization identifies a rate control parameter and allows stream adaptation.

In another embodiment of the invention, a computer-readable medium is provided having thereon computer-executable instructions for performing joint rate control and scalable stream adaptation for multiple clients concurrently competing for one or more access networks. The computer-executable instructions include instructions for constructing an optimization for each client to determine a streaming rate over each access network in an embodiment of the invention. Moreover, instructions for determining the video packets to be transmitted and the access network over which each video packet is to be sent for each client are included as well as instructions for producing an integer program for each client to model the rate control and stream adaptation to minimize a cost function of expected video distortion, such that the minimization identifies a rate control parameter and allows stream adaptation.

In yet another embodiment of the invention, a system for executing joint rate control and scalable stream adaptation is provided. The system includes a streaming server in communication with one or more access networks and a plurality of clients concurrently competing for the one or more access networks. Each client comprises a computer readable medium having thereon computer executable instructions for constructing an optimization to determine a streaming rate over each access network including determining the video packets to be transmitted and the access network over which each video packet is to be sent and producing an integer program for each client to model the rate control and stream adaptation to minimize a cost function of expected video distortion, such that the minimization identifies a rate control parameter and allows stream adaptation.

BRIEF DESCRIPTION OF THE DRAWINGS

Further objects and advantages of the invention will be appreciated from the following description, taken in conjunction with the included drawings, of which:

FIG. 6 is a pseudocode listing illustrating an integer program for joint rate control, deterministic packet scheduling, and distortion optimization according to an embodiment of the invention;

FIG. 7 is a pseudocode listing illustrating a real-valued optimization program distortion-aware randomized packet scheduling according to an embodiment of the invention;

FIG. 8 is a pseudocode listing illustrating the pseudocode for the deterministic packet scheduling algorithm SRDO according to an embodiment of the invention;

FIG. 9 is a pseudocode listing illustrating the pseudocode for the deterministic packet scheduling algorithm PRDO according to an embodiment of the invention;

FIG. 10 is a pseudocode listing illustrating the convex program for the randomized packet scheduling algorithm CPRDO according to an embodiment of the invention;

FIG. 17 is a pair of data plots illustrating the achieved video quality under different background traffic load according to an embodiment of the invention;

DETAILED DESCRIPTION

Since video streaming has high bandwidth and stringent delay requirements, such streaming greatly benefit from multihoming. However, arbitrarily splitting a video stream into multiple substreams and sending each substream over an access network may lead to degraded video quality and playout glitches; this is due to the fact that transmitting a substream at a low rate may under-utilize the network resources, while transmitting at a rate close to the available bandwidth may lead to network congestion which, in turn, causes late packet delivery. Rate control, based on measurements of available bit rate (ABR) and round-trip time (RTT), may be used to achieve a good trade-off between throughput and delay. Once the bit rate of each substream is determined, the video stream is adapted into the right format so that it can be delivered to the client in a timely fashion. This conversion is referred to herein as stream adaptation, which is typically implemented by means of computationally demanding transcoding.

In contrast, scalable video coding, such as the H.264/SVC standard, supports efficient stream adaptation and allows service providers to save expenses on deploying streaming servers and transcoders. Despite a decrease in coding efficiency, modern H.264/SVC coders are reported to significantly outperform previous scalable coding schemes, and even outperform some nonscalable coders such as MPEG-4 ASP (Advanced Simple Profile). Scalable video streams feature complex interdependencies among video packets, for which stream adaptation accounts.

Figure 1:
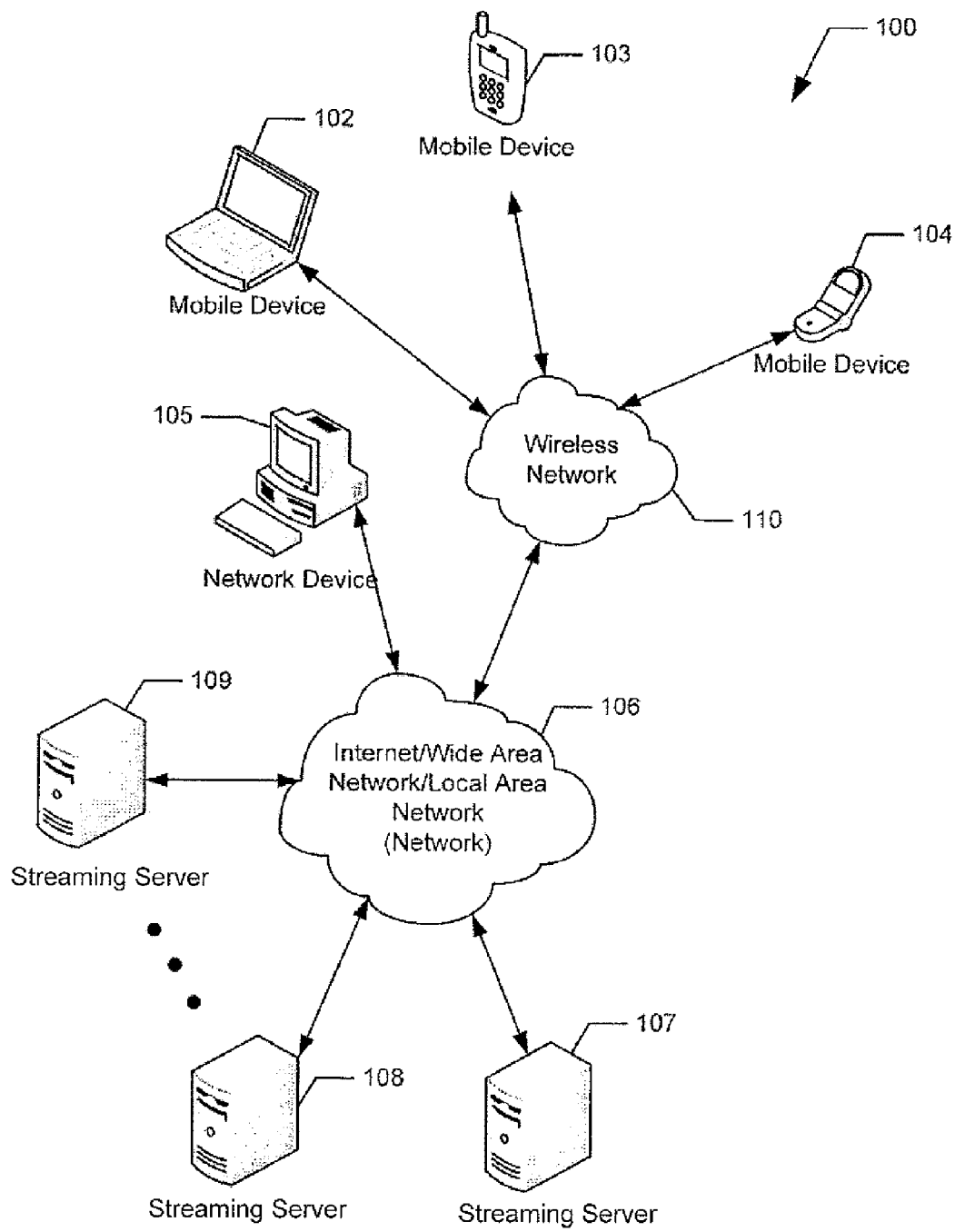
FIG. 1 depicts a network system according to one embodiment of the invention.

Prior to developing the detail of the described innovation in greater detail, a brief overview of communications systems and devices usable within embodiments of the invention will be given. FIG. 1 shows components of one embodiment of an environment in which the invention may be practiced. Not all the components may be required to practice the invention, and variations in the arrangement and type of the components may be made without departing from the spirit or scope of the invention. As shown, system 100 of FIG. 1 include network 106, wireless network 110, mobile devices 102-104, streaming servers 105 and 107-109.

In general, system 100 has a distributed network structure including network consumer nodes (devices). A network consumer node, such as mobile devices 102-104, can directly request and receive data from the streaming servers 105 and 107-109. For example, mobile device 102 can request video data be sent from the streaming servers 105 and 107-109 in a video stream, which is then played back on the screen of the mobile device 102.

Generally, mobile devices 102-104 may include virtually any mobile computing device capable of receiving data over a network, such as wireless network 110, or the like. Such devices include portable devices such as, cellular telephones, smart phones, radio frequency (RF) devices, infrared devices, Personal Digital Assistants (PDAs), handheld computers, laptop computers, wearable computers, tablet computers, integrated devices combining one or more of the preceding devices, or the like.

Wireless network 110 is configured to couple mobile devices 102-104 with network 105. Wireless network 110 may include any of a variety of wireless sub-networks that may further overlay stand-alone ad-hoc networks, or the like, to provide a connection for mobile devices 102-104. Such sub-networks may include mesh networks, Wireless LAN (WLAN) networks, cellular networks, or the like.

Wireless network 110 may further include an autonomous system of terminals, gateways, routers, or the like connected by wireless radio links, or the like. These connectors may be configured to move freely and randomly and organize themselves arbitrarily, such that the topology of wireless network 110 may change rapidly.

Wireless network 110 may further employ a plurality of access technologies including 2nd (2G), 3rd (3G), 4th (4G) generation radio access for cellular systems, WLAN, Wireless Router (WR) mesh, or the like. Access technologies such as 2G, 2.5G, 3G, 4G, and future access networks may enable wide area coverage for mobile devices, such as mobile devices 102-104 with various degrees of mobility. For example, wireless network 110 may enable a radio connection through a radio network access such as Global System for Mobile communication (GSM), General Packet Radio Services (GPRS), Enhanced Data GSM Environment (EDGE), Wideband Code Division Multiple Access (WCDMA), Bluetooth, or the like. In essence, wireless network 110 may include virtually any wireless communication mechanism by which information may travel between mobile devices 102-104 and another computing device, network, or the like.

Network 105 is configured to couple streaming servers 105 and 107-109 with other computing devices, including through wireless network 110 to mobile devices 102-104. Network 105 is enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, network includes any communication method by which information may travel between computing devices.

Illustrative Mobile Devices 102-104 and Network Device 105

Figure 2:
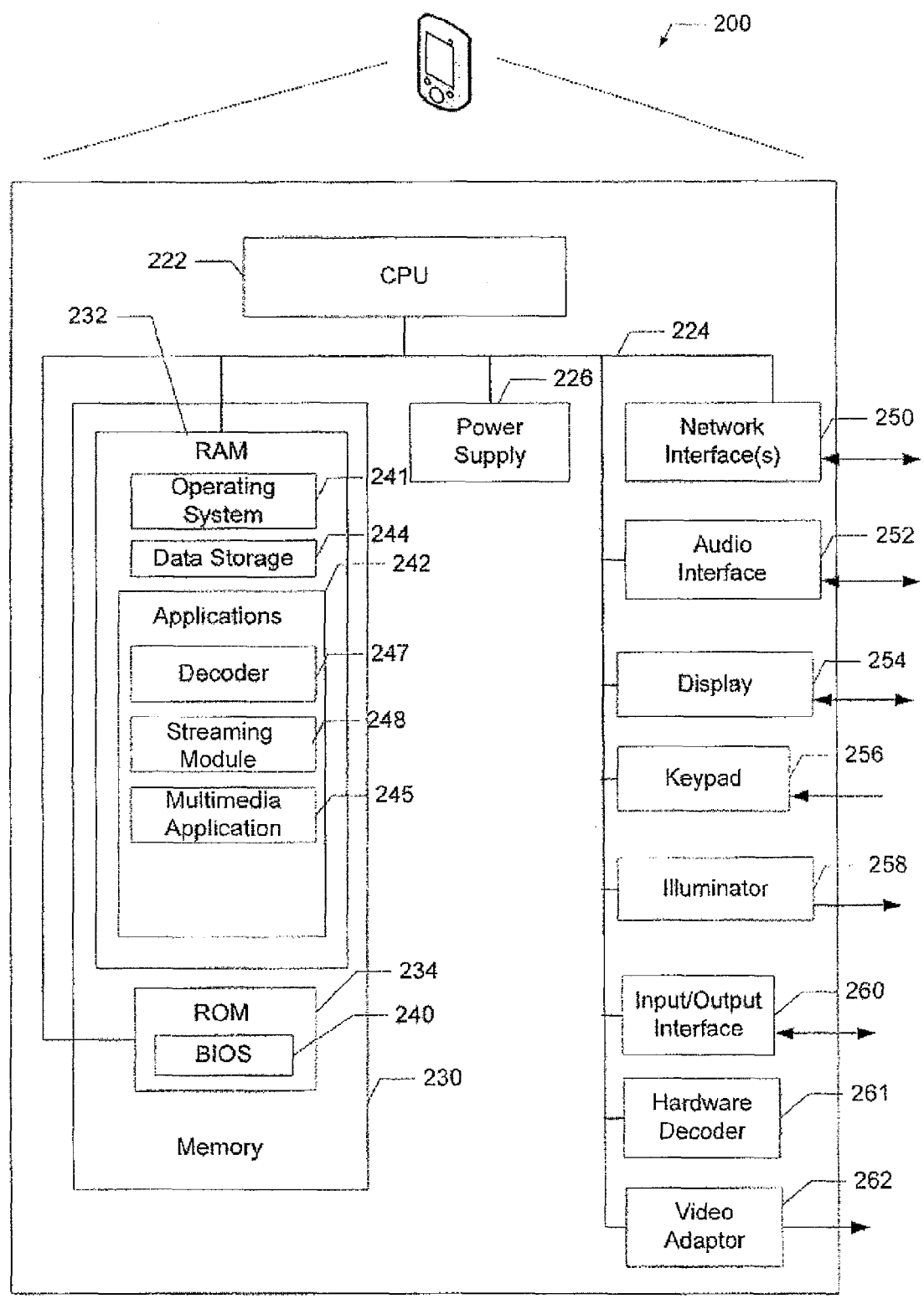
FIG. 2 depicts a schematic diagram of the mobile device shown in FIG. 1.

FIG. 2 shows one embodiment of device 200 that may be included in system 100 implementing the invention. Device 200 may include many more or less components than those shown in FIG. 2. However, the components shown are sufficient to implement an illustrative embodiment for practicing the present invention. Device 200 may represent, for example, one embodiment of at least one of mobile devices 102-104 and network device 105 of FIG. 1.

As shown in the figure, device 200 includes a processing unit (CPU) 222 in communication with a mass memory 230 via a bus 224. Device 200 also includes a power supply 226, one or more network interfaces 250, an audio interface 252, a display 254, a keypad 256, an illuminator 258, and an input/output interface 260. Power supply 226 provides power to device 200. A rechargeable or non-rechargeable battery may be used to provide power. The power may also be provided by an external power source, such as an AC adapter or a powered docking cradle that supplements and/or recharges a battery.

Device 200 can communicate with another computing device directly or indirectly via network interface 250. Network interface 250 includes circuitry for coupling device 200 to one or more networks, and is constructed for use with one or more communication protocols and technologies including, but not limited to, global system for mobile communication (GSM), code division multiple access (CDMA), time division multiple access (TDMA), user datagram protocol (UDP), transmission control protocol/Internet protocol (TCP/IP), SMS, general packet radio service (GPRS), WAP, ultra wide band (UWB), IEEE 802.16 Worldwide Interoperability for Microwave Access (WiMax), SIP/RTP, or any of a variety of other wireless communication protocols. Network interface 250 is sometimes known as a transceiver, transceiving device, or network interface card (NIC).

Audio interface 252 is arranged to produce and receive audio signals such as the sound of a human voice. For example, audio interface 252 may be coupled to a speaker and microphone to enable telecommunication with others and/or generate an audio acknowledgement for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand. In addition, device 200 may further include video adaptor 262, which is configured to provide video signals to an external display.

Keypad 256 may comprise any input device arranged to receive input from a user. For example, keypad 256 may include a push button numeric dial, or a keyboard. Keypad 256 may also include command buttons that are associated with selecting and sending images. Illuminator 258 may provide a status indication and/or provide light. Illuminator 258 may remain active for specific periods of time or in response to events. For example, when illuminator 258 is active, it may backlight the buttons on keypad 256 and stay on while the device is powered. In addition, illuminator 258 may backlight these buttons in various patterns when particular actions are performed, such as dialing another device. Illuminator 258 may also cause light sources positioned within a transparent or translucent case of the device to illuminate in response to actions.

Device 200 also comprises input/output interface 260 for communicating with external devices, such as a headset. Input/output interface 260 can utilize one or more communication technologies, such as USB, infrared, Bluetooth™, or the like.

Device 200 typically ranges widely in terms of capabilities and features. For example, a cell phone 104 may have a numeric keypad and a few lines of monochrome LCD display on which only text may be displayed. In another example, a web-enabled mobile device such as a PDA 103 may have a touch sensitive screen, a stylus, and several lines of color LCD display in which both text and graphics may be displayed. In still another example, a multimedia-enabled mobile device such as laptop 102 may include a multimedia application 245 such as a video player application, which is configured to render images, videos streams, audio signals, or the like through a multimedia interface such as a color LCD or LED screen or a microphone. In still another example, device 200 may also include a browser application configured to receive and display graphics, text, multimedia, or the like, employing virtually any web-based language, including a wireless application protocol messages (WAP), or the like. For example, the browser application is enabled to employ Handheld Device Markup Language (HDML), Wireless Markup Language (WML), WMLScript, JavaScript, Standard Generalized Markup Language (SMGL), HyperText Markup Language (HTML), extensible Markup Language (XML), or the like, to display and send information.

As depicted in FIG. 2, in general, device 200 also includes a decoder. In one embodiment, the decoder is part of the multimedia application 245 described above or a standalone application 247 running in parallel with the multimedia application on the device. In another embodiment, the decoder is provided in a hardware module 261 as part of the hardware circuit in the device. The decoder is configured to decode multimedia data from the data stream received by the device and feed the decoded data to the multimedia application 245 such as the video player. Depending on the coding technique used in the encoded data stream, the decoder can perform loss or lossless decoding. The decoder may utilize proprietary decoding techniques or standardized decoding techniques defined in standard specifications such as H.261, H.264, JPEG, or MPEG.

Device 200 further include a streaming module, which is configured to process the coded data stream received from the streaming servers through network interface 250. The streaming module can be part of the decoder 247 or 261 as described above or can be a standalone application 245, which operates in conjunction with the decoder. In one embodiment, the streaming module operates on top of the Internet Protocol (IP) or other networking protocol as well known in the art. The streaming module is further configured to provide information that identifies device 200, including a type, capability, name, or the like. In one embodiment, device 200 may uniquely identify themselves through any of a variety of mechanisms, including a phone number, Mobile Identification Number (MIN), an electronic serial number (ESN), mobile device identifier, network address, or other identifier.

Illustrative Network Devices 107-109

Figure 3:
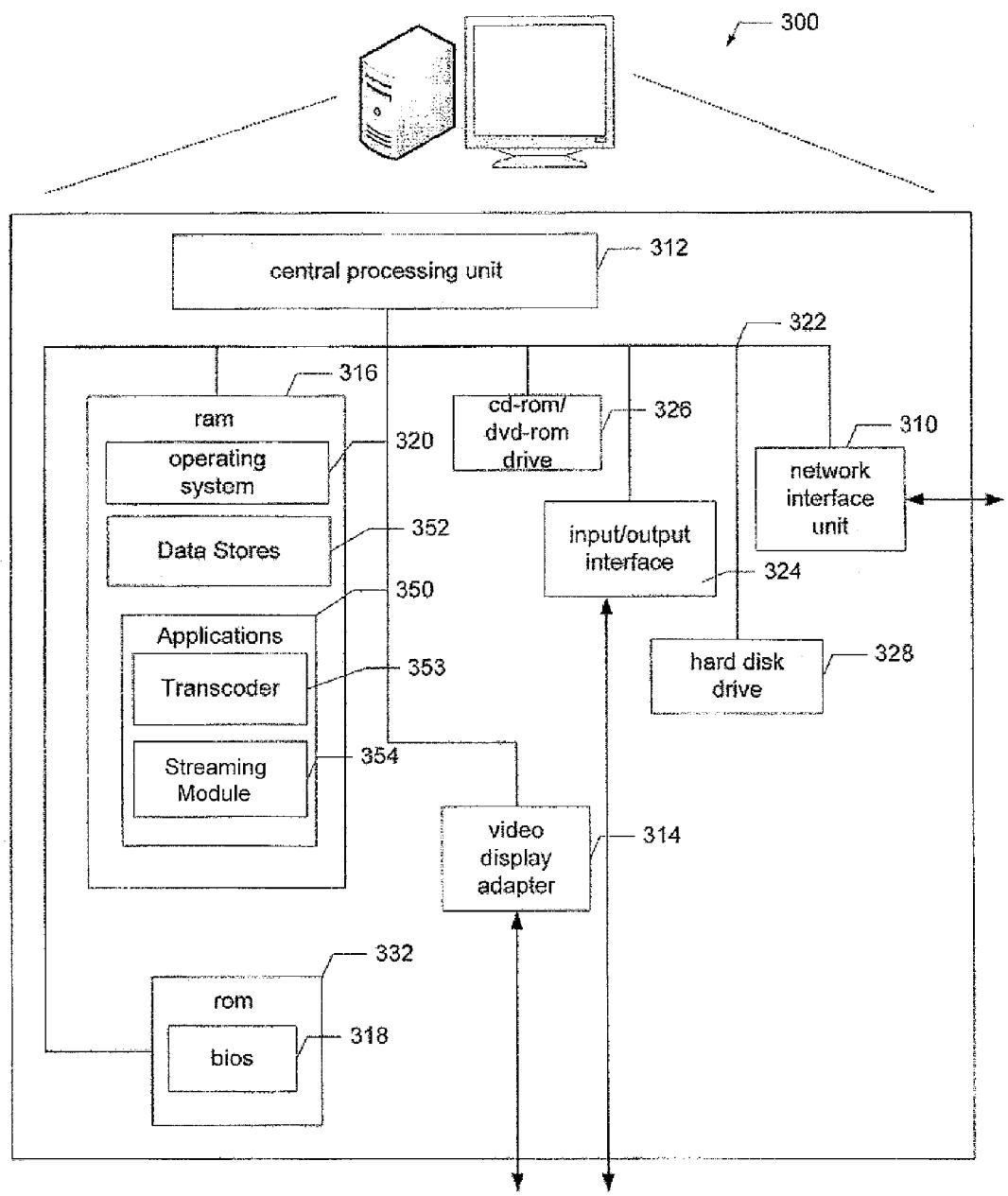
FIG. 3 depicts a schematic diagram of the fixed network device shown in FIG. 1.

FIG. 3 shows one embodiment of streaming servers 300. Server 300 may include many more or less components than those shown. The components shown, however, are sufficient to disclose an illustrative embodiment for practicing the invention. Server 300 may represent, for example, streaming servers 105 and 107-109 of FIG. 1.

Specifically, streaming server 300 includes processing unit 312, video display adapter 314, and a mass memory, all in communication with each other via bus 322. The mass memory generally includes RAM 316, ROM 332, and one or more permanent mass storage devices, such as hard disk drive 328, tape drive, optical drive, and/or floppy disk drive. The mass memory stores operating system 320 for controlling the operation of network device 300. Any general-purpose operating system may be employed. Basic input/output system ("BIOS") 318 is also provided for controlling the low-level operation of network device 300. As illustrated in FIG. 3, streaming server 300 also can communicate with the Internet, or some other communications network, via network interface unit 310, which is constructed for use with various communication protocols including the TCP/IP protocol. Network interface unit 310 is sometimes known as a transceiver, transceiving device, or network interface card (NIC).

The mass memory as described above illustrates another type of computer-readable media, namely computer storage media. As used herein, such computer-readable storage media refers to physical, tangible devices. Computer-readable storage media may include volatile, nonvolatile, removable, and non-removable media implemented in any method or technology for storage of information, such as computer readable instructions, data structures, program modules, or other data. Examples of computer-readable storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other physical devices which can be used to store the desired information and which can be accessed by a computing device.

RAM 316 may include one or more data stores, which can be utilized by network device 300 to store, among other things, applications 350 and/or other data. RAM 316 can also be used to store database information. The mass memory also stores program code and data. One or more applications 350 are loaded into mass memory and run on operating system 320 by central processing unit 312. Examples of application programs may include streaming module 354, schedulers, database programs, encryption programs, security programs, account managers, and so forth.

Figure 4:
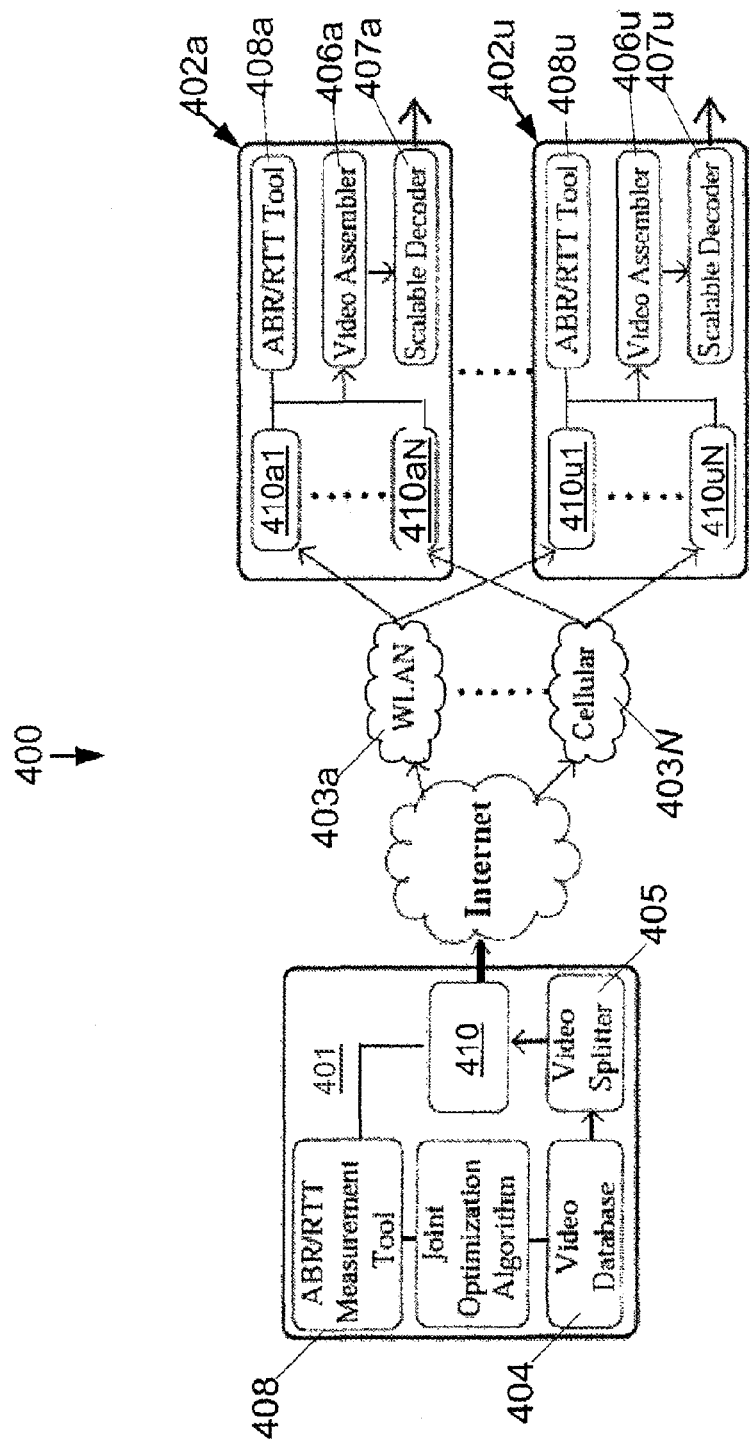
FIG. 4 is a network diagram illustrating an overall system architecture comprising U clients and N access networks within which embodiments of the invention may be implemented.

Turning now to FIG. 4, this figure is a network diagram illustrating an overall system architecture comprising U clients 402a-402u and N access networks 403a-403N within which embodiments of the invention may be implemented. In particular, the multihomed scalable streaming system 400 consists of a scalable streaming server 401 and U multihomed clients 402a-402u. Each client has access to N heterogeneous networks 403a-403N via N network interfaces 410a1 to 410aN and 410u1 and 410uN. The streaming server 401, which interfaces to the network with a network interface 410, contains a database 404 of scalable videos; when requested by a client, a video stream is divided into N substreams by a video splitter 405 which controls the rate of each substream to ensure timely delivery of video packets. For each client 402a-402u, the server 401 sets up a connection over each access network, and transmits substream a (a≤n≤N, with a being equal to 1) over access network a. Each client 402a-402u has a video assembler 406a-406u that combines the received substreams into a single scalable video stream, which is then fed to a video decoder 407a-407u.

Access networks 403a-403N are heterogeneous and time-varying; periodic measurements of the ABR, $c_n$, as well as the RTT, $\tau_n$, may be carried out for each access network 403a-403N using a light-weight measurement tool 408a-408u. In an embodiment of the invention, the measurement tool 408 runs on both server and client sides to monitor end-to-end network conditions.

Turning to a specific example, for a given user u (1≤u≤U) let $r_{u,n}$ be the substream rate over access network n and $$r_n := \sum_{u=1}^{U} r_{u,n}$$

be the total streaming rate for network n. For access network n, let $c_n$ to denote its ABR, and let $p_n$ denote the packet loss probability, which accounts for losses due to packets missing their play-out deadline, $t_0$. While this analysis can accommodate various queuing models, the M/M/1 model yields a good approximation in typical streaming applications. Let the average one-way time simply be half of the RTT. The one-way delay, $t_n$, can be related to the residual bandwidth, $c_n-r_n$, by $$t_n = \frac{\alpha_n}{c_n - r_n},$$

where $\alpha_n$ is a parameter estimated from observations of one-way delay and residual bandwidth via linear regression. Let $$p_n = e^{\frac{t_0(c_n - r_n)}{\alpha_n}}. \quad (5.1)$$

Figure 5:
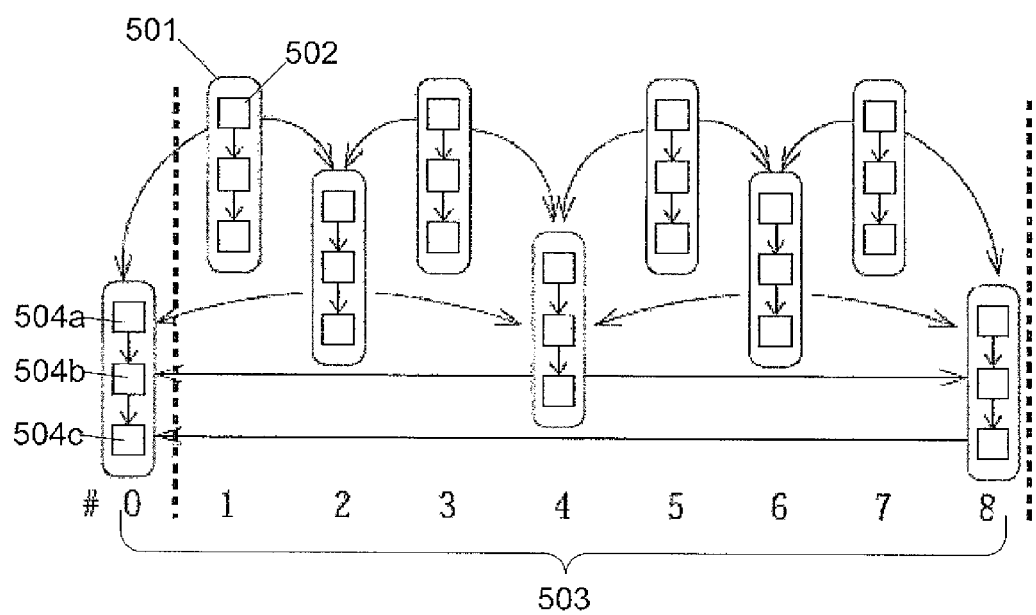
FIG. 5 is a data diagram illustrating a dependency among NALUs of H.264/SVC streams according to an embodiment of the invention.

This example assumes the use of H.264/SVC video streams coded with medium-grained quality scalability (MGS). Each stream u (1≤u≤U) is divided into multiple Network Abstraction Layer units (NALUs) as shown in the data diagram of FIG. 5. In particular, the figure illustrates the dependency among NALUs of H.264/SVC streams, with each square 501 representing a NALU belonging to an MGS layer, and each rounded box 502 representing a video frame.

For user u, each NALU $g_{u,m,q}$ 501 is identified by frame number m (1≤m≤M) (203), and quality layer q (0≤q≤Q) (501a-504c). NALU $g_{u,m,0}$ corresponds to the base layer of frame m, while $\{g_{u,m,q}\}_{q=1}^{Q}$ denote quality enhancement layers. The H.264/SVC standard imposes decoding dependencies among NALUs: $g_{u,m,q}$ (0<q≤Q) depends on all $g_{u,m,q'}$ (q'<q), while $g_{u,m,0}$ depends on its parent frames as determined by the hierarchical prediction structure (see FIG. 5). We let $P_{u,m}$ be the parent frames of frame m. Finally, we use $s_{u,m,q}$ to represent the size of NALU $g_{u,m,q}$.

Let $x_{u,m,q,n}$ be a boolean decision variable which is equal to 1 if $g_{u,m,q}$ is sent over access network n, and is 0 otherwise. It is assumed that a packet will be sent over at most one access network due to efficient link-layer error control mechanisms, such as forward error correction (FEC) and automatic repeat request (ARQ), which are widely applied in wireless networks to reduce packet losses. Thus, sending a NALU over multiple access networks does not lead to significant improvements in video quality, but does increase the network load. Further, $$x_{u,m,q} := \sum_{n=1}^{N} x_{u,m,q,n}$$

is a binary variable with value 1 if NALU $g_{u,m,q}$ is sent over some network and with value 0 otherwise.

The video distortion is modelled in mean square error (MSE). Let $d_{u,m}=e_{u,m}+y_{u,m}$ be the total distortion of frame m, where $e_{u,m}$ denotes the truncation distortion, and $y_{u,m}$ denotes the drifting distortion. Truncation distortion refers to the quality degradation due to dropping NALUs of frame m. Let $\hat{\delta}_{u,m}$ be the full-quality distortion of frame m, achieved when all NALUs are received, and $\hat{\delta}_{u,m,q}$ (0≤q≤Q) be the additional distortion introduced by dropping NALU $g_{u,m,q}$. In order to decode $g_{u,m,q}$, all NALUs $g_{u,m,q'}$ (q'<q) must have been decoded, thus we have $$e_{u,m} = \hat{\delta}_{u,m} + \sum_{q=0}^{Q} \left(1 - \prod_{q' \leq q} x_{u,m,q}\right) \hat{\delta}_{u,m,q}. \quad (5.2)$$

Drifting distortion refers to the distortion caused by imperfect reconstruction of parent frames $P_{u,m}$ used for inter-frame prediction. An affine model as follows is used in an embodiment of the invention:

$$y_{u,m} = \alpha_{u,m} + \sum_{k \in P_{u,m}} \beta_{u,m,k} e_{u,k}. \quad (5.3)$$

where each $\beta_{u,m}$ is constrained to be nonnegative, and where $\alpha_{u,m}, \beta_{u,m}$ are to be estimated from measurements.

The expected distortion of the m-th frame of user u after accounting for random packet losses is represented by $d_{u,m}$ and the vectors $d_u := (d_{n,1}, \ldots, d_{n,M})$, $d := (d_1, \ldots, d_U)$ are defined. The multihomed scalable video streaming problem is one of finding the $x_{u,m,q,n}$ values to minimize a convex cost function C(d): $R^{UM} \to R_+$, which is non-decreasing in each argument. One special case of interest is $$C(d) = \sum_{u=1}^{U} C_u(d_u),$$

where each $C_u(d_u)$ is convex and non-decreasing in each argument. We can provide service differentiation among users and frames by considering different cost functions, e.g., $$C_u(d_u) = \sum_{m=1}^{M} w_{u,m} d_{u,m},$$

$w_{u,m} \geq 0$. We can also address fairness among users, e.g., weighted min-max fairness by setting $$C(d) = \max_{u=1, \ldots, U} w_u \sum_{m=1}^{M} d_{u,m}, \quad w_u \geq 0.$$

For user u, let F be the frame rate in frames-per-second (fps). The average transport stream rate for network n is then given by:

$$r_n = \frac{M}{F} \sum_{u,m} s_{u,m,q} x_{u,m,q,n}. \quad (5.4)$$

Using the network model (5.1), the expected delivery probability of NALU $g_{u,m,q}$ Denoted by $x_{u,m,q} \in [0,1]$ is given by:

$$x_{u,m,q} = \sum_{n=1}^{N} (1 - p_n) x_{u,m,q,n}, \quad (5.5)$$

while the expected truncation distortion is still given by (5.2), and the expected drifting distortion by (5.3).

The joint rate control and stream adaptation problem, considering optimization over M frames, is given by the integer routine shown in FIG. 6. In particular, FIG. 6 is a routine listing for performing joint rate control, deterministic packet scheduling, and distortion optimization. Rate control is performed through (6b); this is a form of proactive congestion control, in the sense that it seeks to avoid causing network congestion, as opposed to the responsive nature of TCP.

In a further embodiment of the invention, randomized packet scheduling is executed by relaxing $x_{u,m,q,n} \in [0,1]$. This is as a soft decision problem, where $x_{u,m,q,n}$ represents the probability that $g_{u,m,q}$ is sent over network n. Based on monotonicity properties, the equality constraints in (6b), (6c), (6e) can be replaced with $\geq, \leq, \geq$ inequality constraints, respectively. This yields an equivalent formulation with no nonlinear equality constraints, which is, however, not convex due to multinomial terms in (6b), (6e). The randomized packet scheduling optimization routine is depicted via the listing 700 of FIG. 7.

Heuristic algorithms for deterministic packet scheduling are utilized in an embodiment of the invention. Such techniques do not explicitly address service differentiation; the total expected distortion is considered as the objective function:

$$C(d) = \sum_{u,m} d_{u,m}.$$

FIG. 8 illustrates pseudocode for a Successive Rate-Distortion Optimization (SRDO) routine 500 according to an embodiment of the invention. The SRDO algorithm takes a maximal allowed packet loss probability $P_{max}$ as the input and sorts NALUs in descending order of $\delta_{u,m,q}/s_{u,m,q}$. It sequentially assigns NALUs to the access network with the smallest $p_n$, as computed via (5.1), until all access networks are fully loaded, i.e., right before the smallest $p_n$ exceeds $P_{max}$.

FIG. 9 illustrates pseudocode for a Progressive Rate-Distortion Optimization (PRDO) algorithm 600 according to an embodiment of the invention. The PRDO algorithm considers the net distortion gain of assigning NALU $g_{u,m,q}$ over access network n, namely $b_{u,m,q,n}$, based on the distortion model (cf. (5.1)-(5.4)). Following the video prediction structure, PRDO sequentially schedules the immediately decodable NALU $g_{u,m,q}$ with the largest nonnegative $b_{u,m,q,n}/s_{u,m,q}$ value, to access network n. The algorithm 900 stops when all packets have been scheduled, or when all unscheduled NALUs have non-positive net distortion values.

Pseudocode 1000 for a Convex-programming Rate-Distortion Optimization (CPRDO) routine according to an embodiment of the invention is shown in FIG. 10. The CRPDO is a randomized packet scheduling algorithm; the probability of sending NALU $g_{u,m,q}$ over network n, namely $x_{u,m,q,n}$, is calculated by numerically solving the convex program shown in FIG. 10 in real-time, e.g., using CVX. This convex program is a convex approximation of the randomized packet scheduling problem (see FIG. 7), by approximating the multilinear function of (7d) by its concave envelope, and the multilinear terms in (7e) in a term-by-term fashion.

Figure 11:
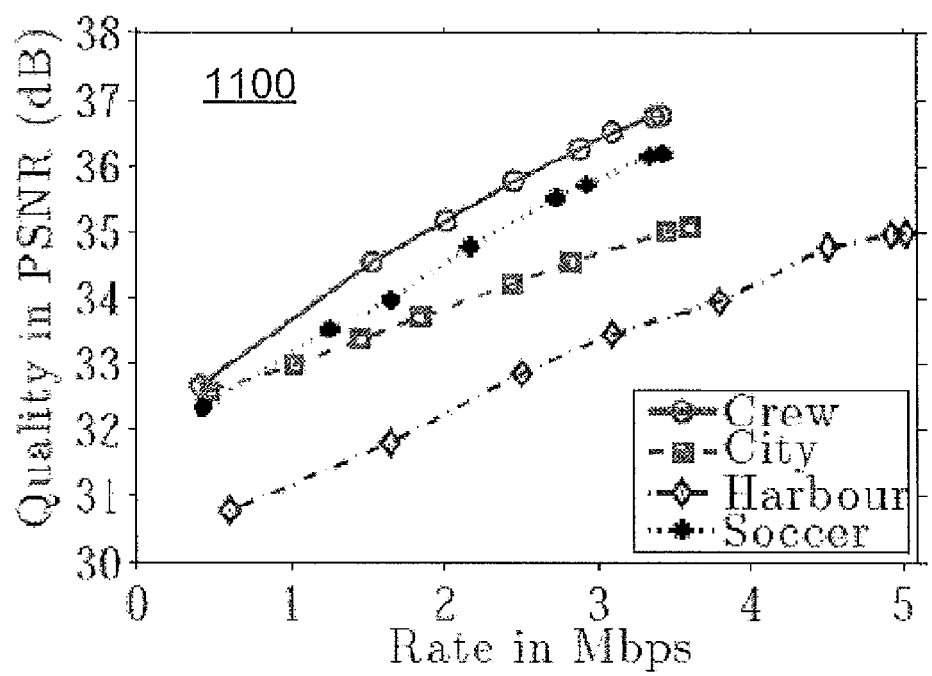
FIG. 11 is a data plot illustrating the R-D curves for the considered video sequences according to an embodiment of the invention.

The known Abing available bandwidth estimation tool (Abing) was used to periodically measure ABR and RTT values between hosts on two networks; Abing was chosen because it converges quickly and is also light-weight. Network traces were collected between Deutsche Telekom Laboratories (Berlin) and Stanford University. At Deutsche Telekom Laboratories, Abing was run over three access networks: Ethernet, 802.11b, and 802.11g. Four 4CIF (704×576) video sequences were evaluated: City, Soccer, Crew and Harbour, encoded as scalable streams using JSVM Reference software. After testing different numbers of MGS layers Q it was found that Q does not critically affect coding efficiency. In the simulations, each video was encoded into a scalable stream with eight MGS layers (Q=7). To illustrate the video characteristics of individual videos, the Rate-Distortion (R-D) curves (rate vs. quality) are plotted in plot 1100 of FIG. 11.

Figure 12:
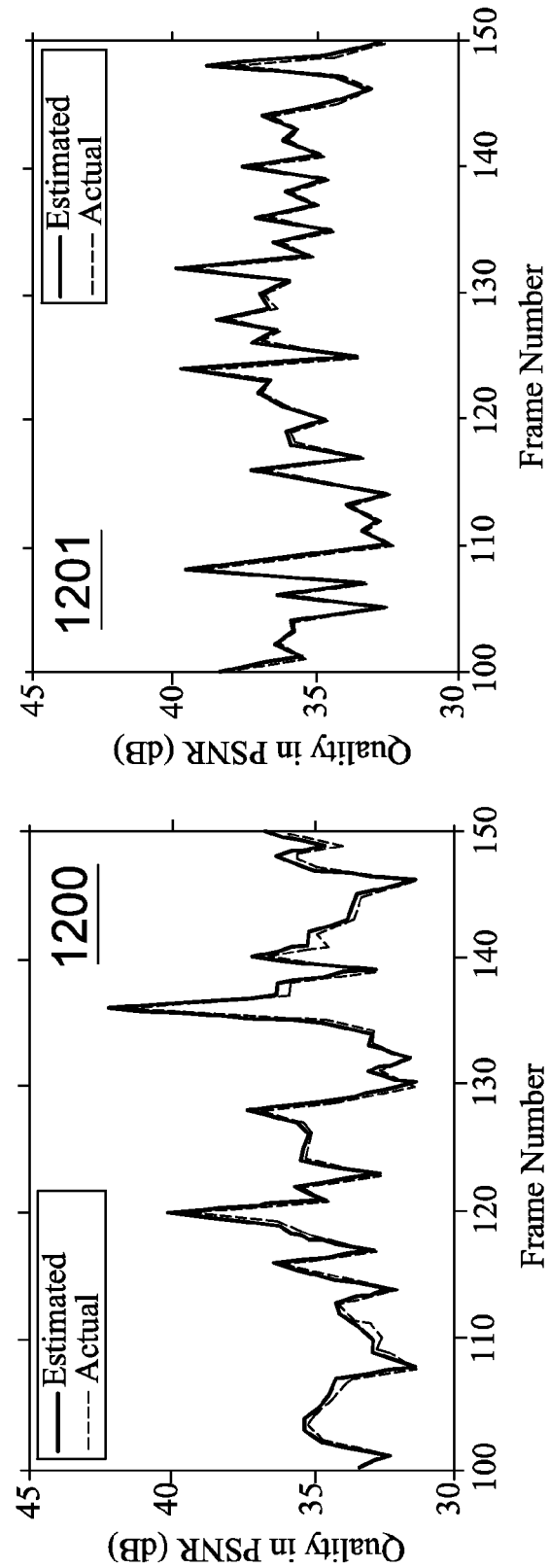
FIG. 12 is a pair of data plots illustrating the model accuracy according to an embodiment of the invention.

Video model parameters were estimated by extracting and decoding 32 random substreams from each stream and measuring the rendered video quality; standard least-squares model parameter estimation was then applied. To evaluate the accuracy of the video model, 32 substreams were randomly extracted from each video stream, the empirical per-frame video quality was computed and compared to the video quality estimated by the video model. The plots 1200 and 1201 of FIG. 12 show the actual and estimated video quality for Soccer and Crew; the proposed video model is quite accurate: the approximation errors for City, Soccer, Crew and Harbour were measured to be 2.82%, 1.38%, 0.74%, and 1.65%, respectively.

A multihomed streaming server was implemented in NS-2 which supports the SRDO, PRDO, and CPRDO algorithms, implemented as Matlab subroutines; CPRDO was solved numerically using CVX. Run-time values were reported corresponding to a 2.8 GHz PC with Matlab R2010a. For comparison, we have also implemented a multihomed DCCP streaming server, based on an open-source DCCP implementation which supports two standard rate control algorithms: TCP-like and TCP-friendly rate control (TFRC). The DCCP streaming server sets up a connection over each access network and assigns NALUs to each connection from lower to higher quality layers until reaching the rate limit computed by the rate control algorithms. The DCCP streaming servers with TCP-like and TFRC rate control algorithms are referred to as DCCP-TCP and DCCP-TFRC, respectively.

Multihomed video streaming sessions were simulated using the four videos with random start times in the network traces, while injecting background traffic over each network at a rate 20%-90% of its available bandwidth. We have chosen M=32, Q=7, $t_0$=1 sec, and $P_{max}$=0.1. The maximum UDP packet size was set to 1000 bytes. If not otherwise specified, results of experiments with 40% background traffic are reported, using the average total distortion as a cost function. We have conducted simulations with a single user (U=1) and compared the performance of the proposed algorithms and the rate control algorithms defined in DCCP standard. We also ran the CPRDO algorithm for three streams (U=3) of different videos. For each setup, we have tested the algorithms 300 times, and consider four performance metrics: video quality in PSNR (Peak Signal-to-Noise Ratio), streaming rate, packet delivery delay, and running time.

Figure 13:
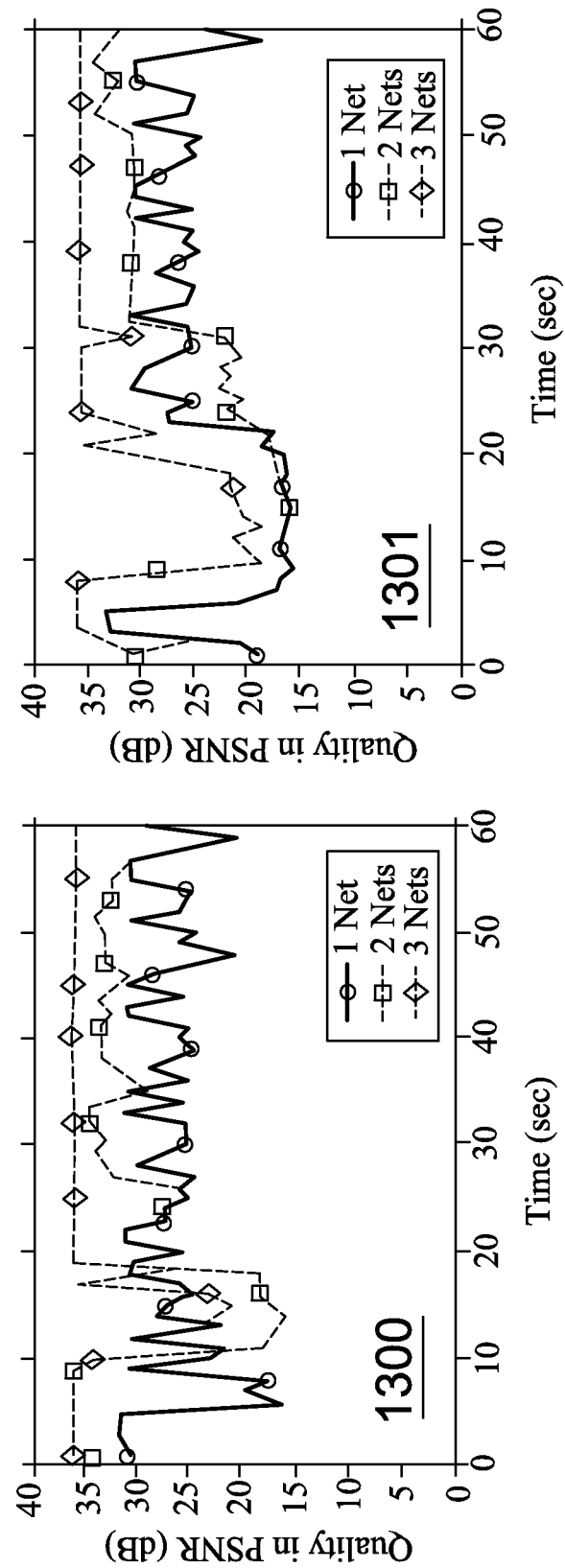
FIG. 13 is a pair of data plots illustrating the achieved video quality for different numbers of access networks according to an embodiment of the invention.

The DCCP streaming server was instructed to transmit the City sequence over one, two, and three access networks and to compute the video quality achieved under 40% background traffic. The sample results of a 60-sec period for DCCP-TCP and DCCP-TFRC are plotted in the plots 1300 and 1301 in FIG. 13, which show that multihoming can significantly increase video quality and reduce quality fluctuations.

The video quality achieved by the proposed algorithms was compared against the DCCP rate control algorithms under 40% background traffic. In plot 1400 of FIG. 14, the video quality achieved is plotted (plot using each algorithm for a 60-sec sample period). It can be seen that both DCCP-TCP and DCCP-TFRC suffer from sudden quality drops and that the algorithms described herein achieve high video streaming quality. The described algorithms do not suffer from quality fluctuations due to the proactive nature of the rate control scheme, as opposed to the responsive nature of TCP and TCP-friendly congestion controllers. The algorithms described herein outperform the DCCP rate control algorithms by about 10-15 dB in video quality.

Figure 15:
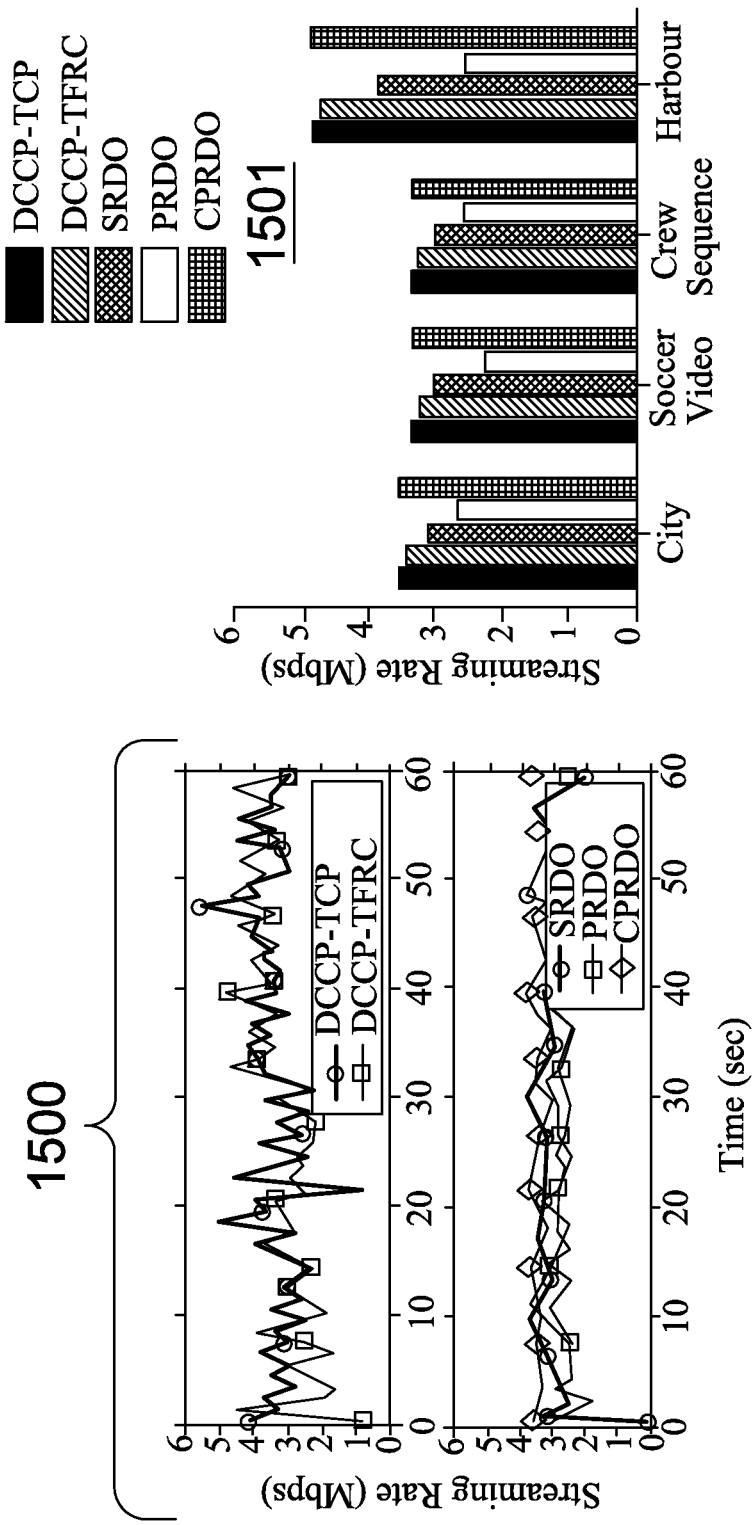
FIG. 15 is a pair of data plots illustrating the streaming rate achieved by the different algorithms according to an embodiment of the invention.

The DCCP rate control algorithms are designed to be TCP-friendly. The streaming rates achieved by different algorithms are shown in FIG. 15: FIG. 15 plot 1500 shows a sample time period, which reveals that the DCCP rate control algorithms results in higher rate fluctuations while the proposed algorithms lead to smoother streaming rates. This can be again attributed to the proactive rate control nature of the proposed algorithms, as opposed to the reactive rate control used by DCCP. FIG. 15 plot 1501 plots the average streaming rates for all videos; the proposed algorithms result in streaming rates comparable to (if not lower than) the DCCP rate control algorithms, and hence are also TCP-friendly.

Figure 16:
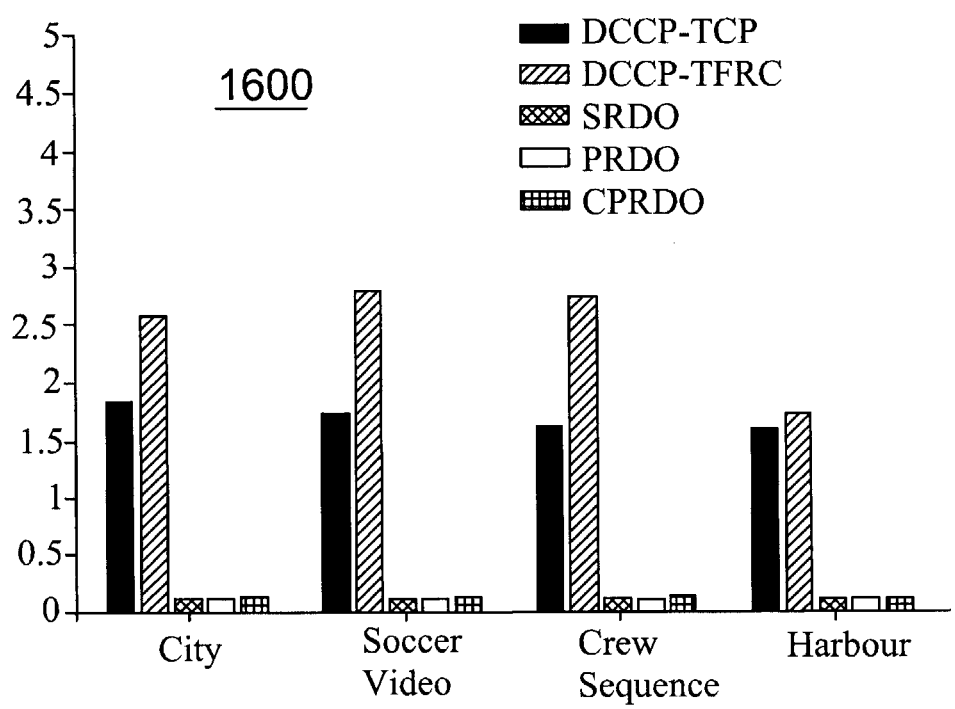
FIG. 16 is a bar chart illustrating the average packet delivery delay according to an embodiment of the invention.

The average packet delivery delay fis calculated for the different algorithms. The plot 1600 of FIG. 16 reveals that, for all videos, DCCP-TCP and DCCP-TFRC lead to on average about 1.7 and 2.5 sec delay, respectively, while the proposed algorithms result in less than 0.2 sec delay. This shows that schedules produced by the proposed algorithms deliver more packets on time, which, in turn, renders better video quality compared to DCCP.

The performance of the proposed algorithms was evaluated under different background traffic load, between 20% and 90%. Plot 1700 of FIG. 17 presents the achieved video quality for the Harbour and Crew sequences. This figure shows that the CPRDO algorithm outperforms the PRDO algorithm, which in turn outperforms the SRDO algorithm; among all videos, the maximum, mean, and minimum quality improvements over SRDO are 7.36, 4.33, and 1.19 dB. The maximum, mean, and minimum quality improvements over PRDO are 4.71, 1.84, and −0.33 dB.

Figure 14:
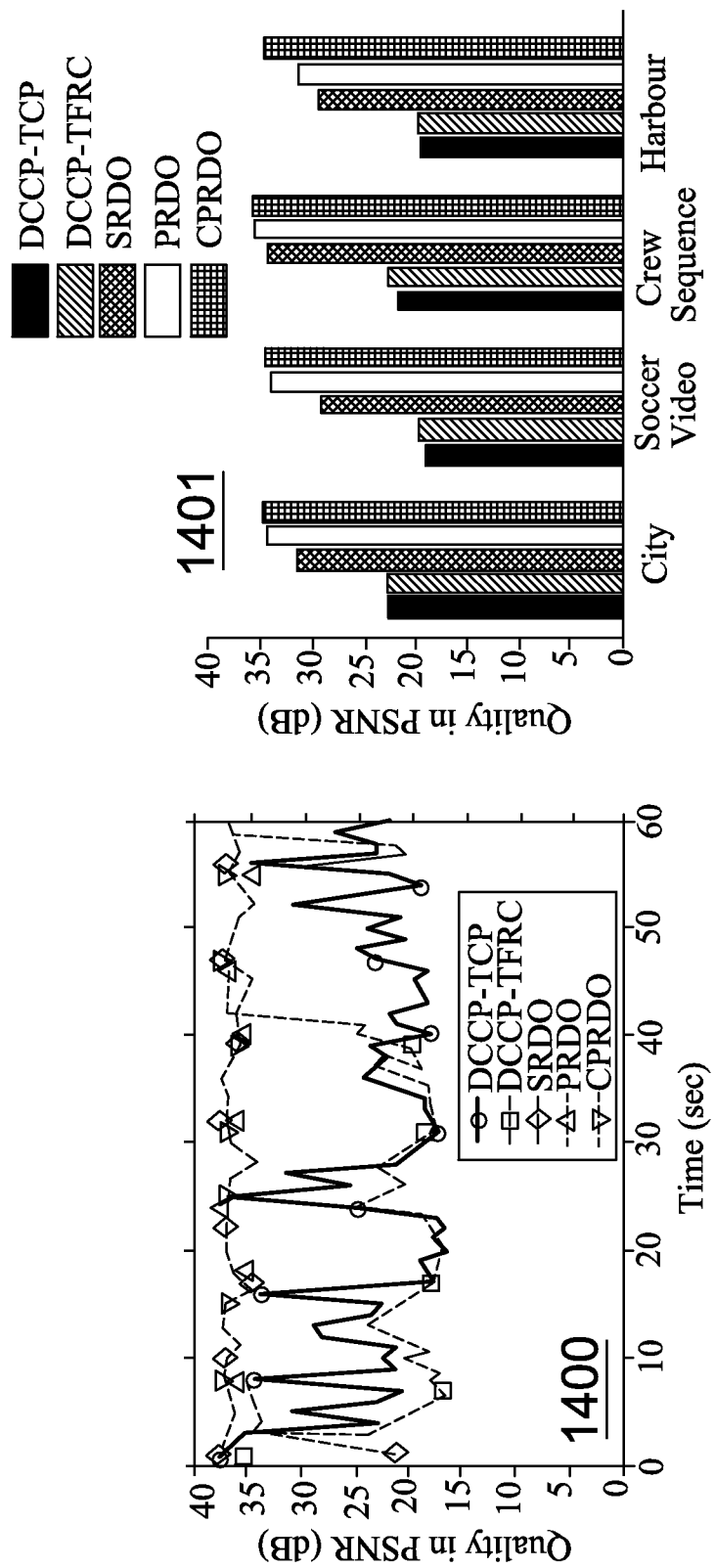
FIG. 14 is a pair of data plots illustrating the achieved video quality by the different algorithms according to an embodiment of the invention.
Figure 18:
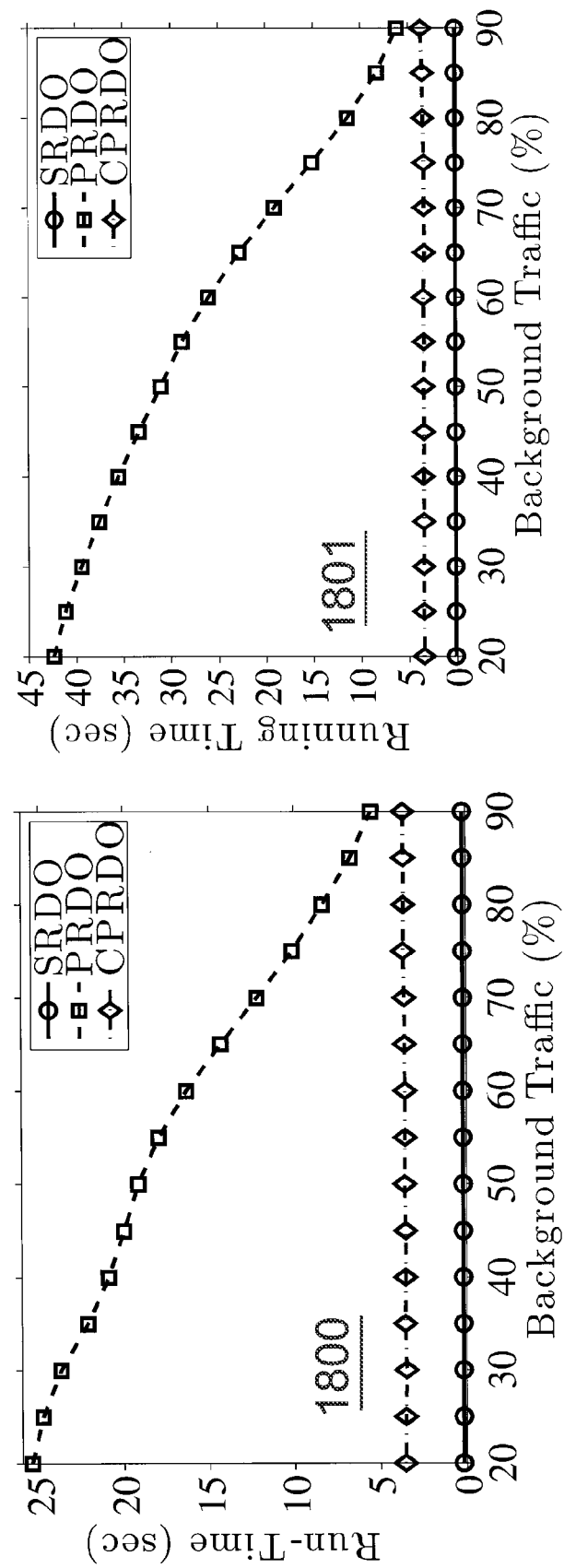
FIG. 18 is a pair of data plots illustrating the running time of the different algorithms according to an embodiment of the invention.

Plots 1800 and 1801 of FIG. 18 present the running time of the proposed algorithms for Harbour and Crew respectively; the CPRDO algorithm reduces the running time by up to 10 times in comparison with PRDO. SRDO runs fast, less than 200 msec on average, but it results in lower video quality as illustrated in FIG. 14. Therefore, we propose to use the CPRDO algorithm for a good trade-off between performance and running time.

The CPRDO was used in an embodiment of the invention to stream different videos to three clients under 40% background traffic load. Three cost functions $C_{(1,1,1)}, C_{(5,1,1)}, C_{(100,10,1)}$ were considered, where $$C_{(w_1, w_2, w_3)} := \sum_{u=1}^{3} w_u \sum_{m=1}^{M} d_{u,m}.$$

Figure 19:
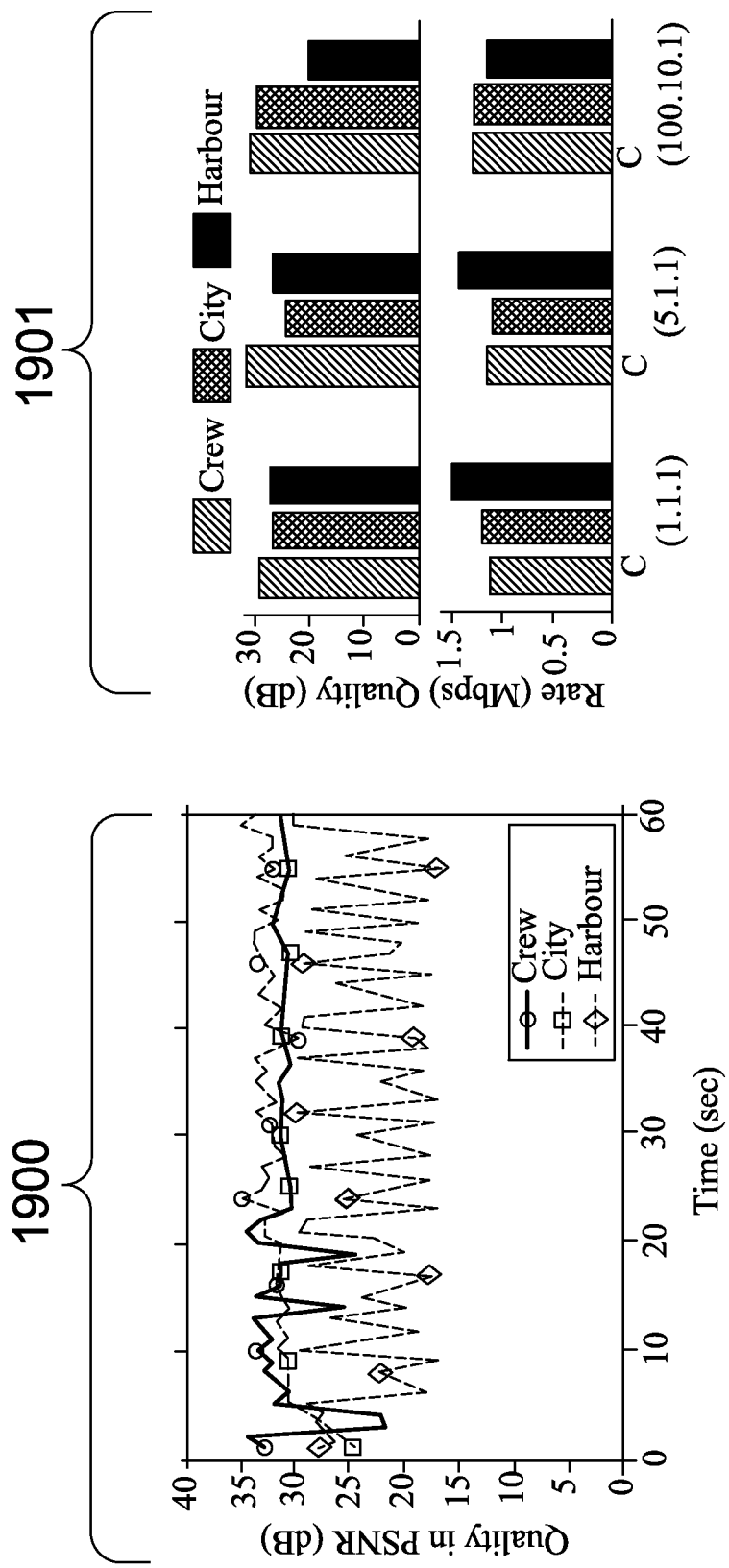
FIG. 19 is a pair of data plots illustrating the service differentiation provided by CPRDO according to an embodiment of the invention.

The video quality of individual clients with $C_{(100,10,1)}$ is plotted in FIG. 19, plots 1900 and 1901, and as can be seen, CPRDO indeed provides service differentiation.

Although the described embodiments execute certain activities in a centralized manner, it will be appreciated that the tasks may be distributed for bandwidth or other considerations. For example, rather than centrally calculating available bandwidth, such task may be executed at one or more client machines, with the appropriate underlying data being transmitted to the machine or machines executing the task.

All references, including publications, patent applications, and patents, cited herein are hereby incorporated by reference to the same extent as if each reference were individually and specifically indicated to be incorporated by reference and were set forth in its entirety herein.

The use of the teems "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A computerized method for joint rate control and scalable stream adaptation for multiple clients concurrently competing for one or more access networks, comprising:
   receiving, by a server, video requests from a plurality of clients;
   setting up, by the server, connections with the plurality of clients over a plurality of access networks;
   dividing, by the server, scalable video streams corresponding to the video requests into pluralities of Network Abstraction Layer units (NALUs), each NALU corresponding to a frame of a video stream, and scheduling the NALUs for transmission, wherein the dividing and scheduling comprises:
      calculating an estimated truncation distortion for each frame for each of the plurality of clients corresponding to distortion caused by dropping NALUs during transmission;
      calculating an estimated drifting distortion for each frame for each of the plurality of clients corresponding to distortion caused by imperfect reconstruction of frames used for inter-frame prediction; and
      minimizing a cost function so as to account for random packet losses during delivery of video streams to all of the plurality of clients, wherein the cost function includes a summation taking into account the estimated truncation distortions calculated for each frame for each of the plurality of clients and the estimated drifting distortions calculated for each frame for each of the plurality of clients; and
   transmitting, by the server, the NALUs over the plurality of access networks to the plurality of clients based on the dividing and scheduling.

2. The method according to claim 1, wherein the server includes a database of scalable videos.

3. The method according to claim 1, wherein the scalable video streams are H.264/SVC video streams.

4. The method according to claim 3, wherein the H.264/SVC video streams are coded with medium-grained quality scalability (MGS).

5. A non-transitory computer-readable medium having thereon computer-executable instructions for performing joint rate control and scalable stream adaptation for multiple clients concurrently competing for one or more access networks, the computer-executable instructions comprising instructions for:
   receiving video requests from a plurality of clients;
   setting up connections with the plurality of clients over a plurality of access networks;
   dividing scalable video streams corresponding to the video requests into pluralities of Network Abstraction Layer units (NALUs), each NALU corresponding to a frame of a video stream, and scheduling the NALUs for transmission, wherein the dividing and scheduling comprises:
      calculating an estimated truncation distortion for each frame for each of the plurality of clients corresponding to distortion caused by dropping NALUs during transmission;
      calculating an estimated drifting distortion for each frame for each of the plurality of clients corresponding to distortion caused by imperfect reconstruction of frames used for inter-frame prediction; and
      minimizing a cost function so as to account for random packet losses during delivery of video streams to all of the plurality of clients, wherein the cost function includes a summation taking into account the estimated truncation distortions calculated for each frame for each of the plurality of clients and the estimated drifting distortions calculated for each frame for each of the plurality of clients; and
   transmitting the NALUs over the plurality of access networks to the plurality of clients based on the dividing and scheduling.

6. The non-transitory computer-readable medium according to claim 5, wherein the scalable video streams are H.264/SVC video streams.

7. The non-transitory computer-readable medium according to claim 6, wherein the H.264/SVC video streams are coded with medium-grained quality scalability (MGS).

* * * * *